United States Patent
Ogino

(10) Patent No.: US 8,736,740 B2
(45) Date of Patent: May 27, 2014

(54) OPTICAL APPARATUS AND METHOD FOR CONTROLLING SAME

(75) Inventor: Hiroyuki Ogino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 13/471,598

(22) Filed: May 15, 2012

(65) Prior Publication Data

US 2012/0320254 A1 Dec. 20, 2012

(30) Foreign Application Priority Data

Jun. 14, 2011 (JP) .................................. 2011-132562

(51) Int. Cl.
*G03B 13/00* (2006.01)
*H04N 5/232* (2006.01)

(52) U.S. Cl.
USPC ............ 348/345; 348/351; 348/356; 348/347

(58) Field of Classification Search
USPC .......... 327/108, 306, 308; 348/208.12, 220.1, 348/345, 348–357, 361; 396/134
See application file for complete search history.

(56) References Cited

U.S. PATENT DOCUMENTS

2004/0125229 A1* 7/2004 Aoyama et al. ............... 348/345
2009/0067829 A1* 3/2009 Li et al. ......................... 396/135
2011/0156763 A1* 6/2011 Gao et al. ....................... 327/108

FOREIGN PATENT DOCUMENTS

JP H7-115580 A 5/1995

* cited by examiner

Primary Examiner — Lin Ye
Assistant Examiner — Euel Cowan
(74) Attorney, Agent, or Firm — Carter, DeLuca, Farrell & Schmidt LLP

(57) ABSTRACT

A control unit that carries out focus adjustment by the drive control of a focus lens changes an oscillation convergence waiting time of the focus lens after stopped according to the imaging conditions. In the case in which an aperture value is larger than a predetermined value and the tolerated range of a focus deviation amount that accompanies the oscillation of the lens with stopped is large, the waiting time set in a timer is changed so as to be short in comparison to the waiting time that is set in the case in which the tolerated range of a focus deviation amount is small. The control unit outputs a stop command for a focus lens and ends the movement control of the focus lens after waiting for the passage of a time that has been calculated by a timer.

19 Claims, 11 Drawing Sheets

OPTICAL APPARATUS AND METHOD FOR CONTROLLING SAME

BACKGROUND OF THE INVENTION

1. Field of the Invention

The present invention relates to an optical apparatus such as an imaging apparatus having a focus adjustment function and a method for controlling the same.

2. Description of the Related Art

Conventionally, in electronic still cameras or video cameras or the like, an autofocus (below, abbreviated "AF") is used. In AF control, the controller of the camera calculates the focal position of the focus lens based on image data that is read out from an imaging element that uses a CCD (charge coupled device) and the like or data that has been read out from a dedicated distancing sensor. The controller moves the focus lens to the focal position by controlling a motor, and carries out the imaging operation after the movement has ended. In this context, because the focus lens oscillates in the optical axis direction due to inertia immediately after the focus lens has been stopped, there is a concern that this may influence the image quality if a photograph is taken immediately. Thus, the controller starts imaging after waiting for a specific time to pass until the oscillation of the focus lens converges.

Various technologies have been proposed to handle the influence that the oscillation and misalignment of the focus lens in the optical axis direction has on an image. In the apparatus disclosed in Japanese Patent Laid-open No. H07-115580, the blur amount at the focal plane is calculated based on the value of the diaphragm. This is the blur amount at the focal plane in relation to a unit drive amount of a pulse motor that drives the focus lens. This apparatus changes the pulse number of a pulse motor in correspondence to the amount that the focus lens has overshot the focal peak point based on the calculated value of the blur amount.

Here, originally the oscillation of the focus lens in the optical axis direction may converge within a range that does not influence the image quality, and the convergence range at this time differs depending on the imaging conditions. However, in a conventional apparatus, irrespective of the imaging conditions, the apparatus simply waits until the oscillation is within a fixed convergence range. Thus, needless waiting time occurs, and there is a concern that this will hinder speedy photography.

SUMMARY OF THE INVENTION

Thus, the present invention reduces needless waiting time during imaging by changing the oscillating convergence waiting time of the focus lens depending on the imaging conditions.

According to an aspect of the present invention, an apparatus is an optical apparatus that is provided with an optical system that carries out focus adjustment and a drive unit that moves a lens that forms the optical system, and is provided with a control unit that carries out focus adjustment by controlling the drive unit and a timer device that sets a waiting time that is changed by the control unit. The control unit changes the waiting time that is set in the case in which the tolerated range of the focus deviation amount that accompanies the oscillation when the lens has stopped is large so as to be short in comparison to the waiting time that is set in the case in which the tolerated range of the focus deviation amount is small. After outputting a control command that stops the lens to the drive unit the movement control of the lens ends after the waiting time that has been calculated by the timer device has elapsed.

Further features of the present invention will become apparent from the following description of exemplary embodiments with reference to the attached drawings.

DESCRIPTION OF THE EMBODIMENTS

Below, each embodiment of the optical apparatus of the present invention will be explained with reference to the appended figures.

First Embodiment

Figure 1:
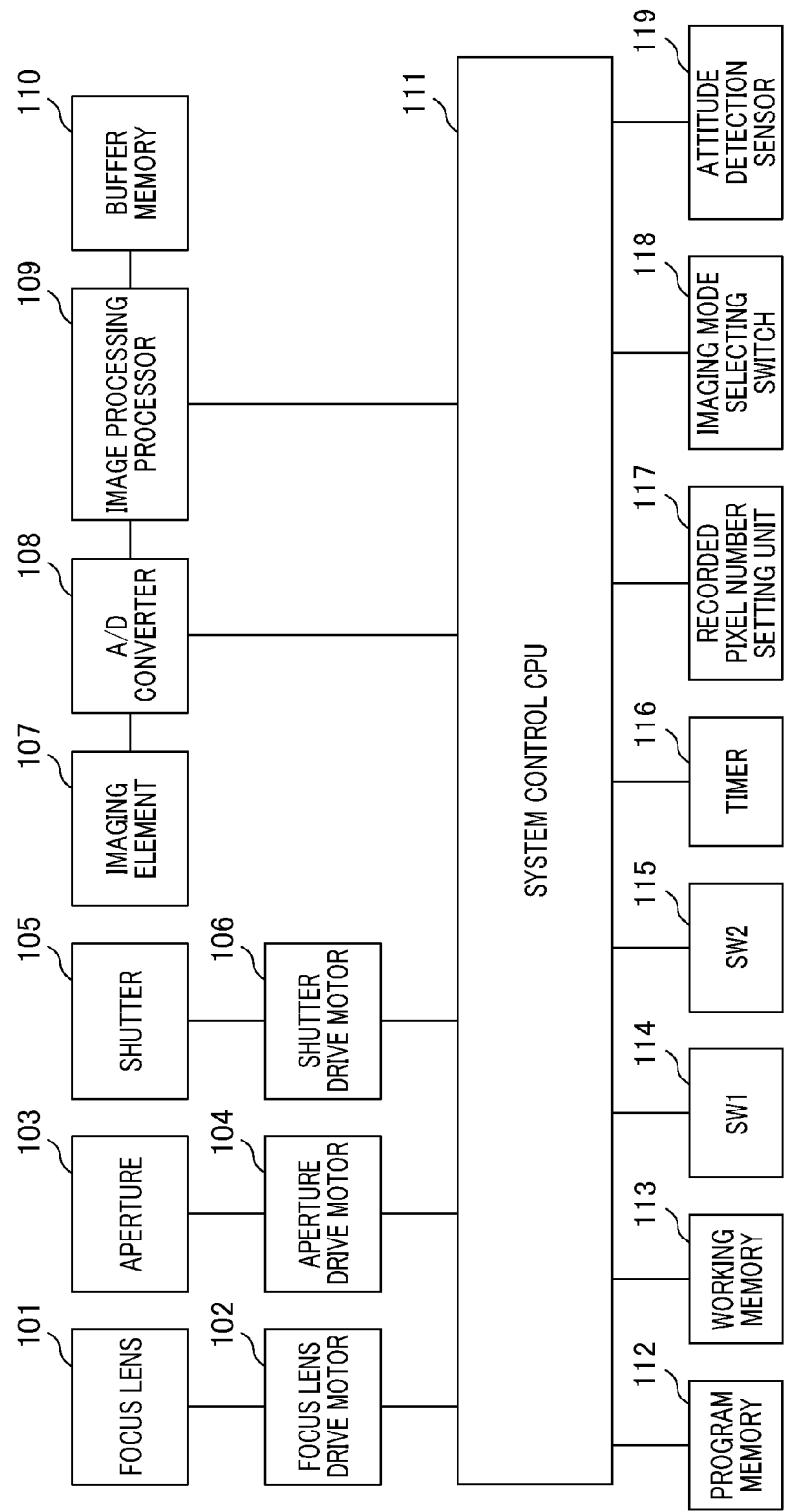
FIG. 1 is a block diagram that shows an example of the configuration of an apparatus for explaining, in conjunction with FIGS. 2 to 7, a first embodiment of the present invention.

FIG. 1 is a block diagram that shows an example of a configuration of an electronic still camera as an imaging apparatus according to a first embodiment of the present invention. The focus lens 101 is a lens for focus adjustment that forms a portion of the imaging optical system, and is an optical member for aligning the focus on the imaging element to be described below. Note that in FIG. 1, the illustration of other optical members that form the imaging optical system is omitted. The focus lens drive motor 102 is a drive unit for the focus lens 101. The diaphragm 103 limits the incident light amount from the subject, and is driven by the diaphragm drive motor 104. The shutter 105 blocks the incident light from the subject, and is driven by the shutter drive motor 106.

An imaging element 107 converts the incident light from the subject to an electric signal. An A/D converter 108 converts the analog signal that has been output by the imaging element 107 to a digital signal. An image processing processor 109 implements predetermined processing on the image data that has been output by the A/D converter 108. A buffer memory 110 temporarily stores the image data that has been processed by the image processing processor 109.

A CPU (central processing unit) 111 is a controller for system control that directs the imaging sequence and the like. A program memory 112 stores programs that are interpreted and executed by the CPU 111. The working memory 113 temporarily stores the various types of data that are necessary when the CPU 111 carries out processing according to the programs that are stored in the program memory 112. A first switch (below, referred to as "SW1") 114 is an operation unit that detects the imaging preparation of the auto-exposure control (below, abbreviated "AE"), the AF, and the like. A second switch (below, referred to as "SW2") 115 is an imaging processing command switch by which a user directs the imaging processing of the exposure light and the recording operation and the like after operating the first switch 114. A timer 116 carries out a timing calculation operation according to time setting performed by the CPU 111. A recorded pixel number setting unit 117 sets the number of pixels (the vertical and horizontal size) of a recorded image. The image data that has been read out from the imaging element 107 is converted to data having the pixel number that has been set by the recorded pixel number setting unit 117 in the image process processor 109. The imaging mode selecting switch 118 is an operation unit by which the user selects and sets the imaging mode. An attitude detecting sensor 119 detects the attitude of the imaging apparatus. Note that each of the units shown by reference numerals 112 to 119 is connected to the CPU 111.

Next, the operation of the imaging apparatus will be explained. In the following explanation, to the extent that processes such as storage and identification and the like are not explained in particular, they are carried out by the CPU 111 based on programs that are stored in the program memory 112. In addition, to the extent that the storage of arithmetic results or various types of processed data are not explained in particular, they are stored in the working memory 113.

Figure 2:
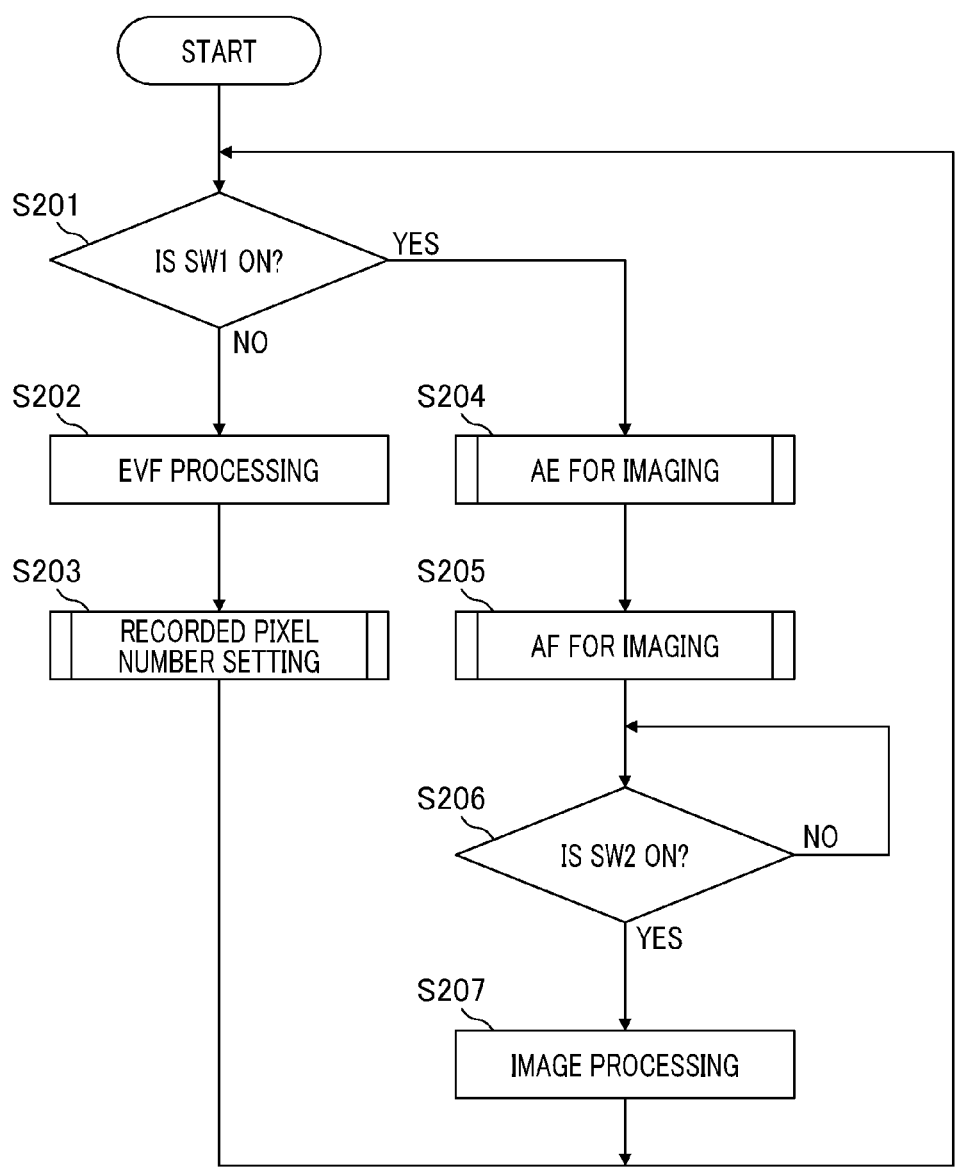
FIG. 2 is a flowchart that exemplifies the basic operation of the apparatus that is shown in FIG. 1.

FIG. 2 is a flowchart for explaining the overall operation of the imaging apparatus.

First, in S201, the CPU 111 determines the state of SW1, which directs the imaging preparation. If SW1 is ON, the processing proceeds to S204, and if SW1 is OFF, the processing proceeds to S202. In S202, the CPU 111 executes EVF processing in order to display an image during imaging standby time on an image display unit (not illustrated). In this EVF process, AE, AF, auto-white balance (AWB), display image processing, and image display processing on an image display unit (not illustrated) and the like are carried out under the control of the CPU 111. In S203, the recorded pixel number is set according to procedures to be described below.

S204 is AE processing for the imaging, and S205 is AF processing for the imaging. These processes are carried out according to a procedure to be described below. In S206, the CPU 111 identifies the state of SW2, which directs the imaging process. If SW2 is ON, the processing proceeds to S207, and if SW2 is OFF, the identification of the state of SW2 is carried out again. In S207, the CPU 111 performs the exposure and the readout of the imaging element 107, and image processing such as image processing by the image processing processor 109 and recording to a recording medium (not illustrated) are carried out.

Figure 3:
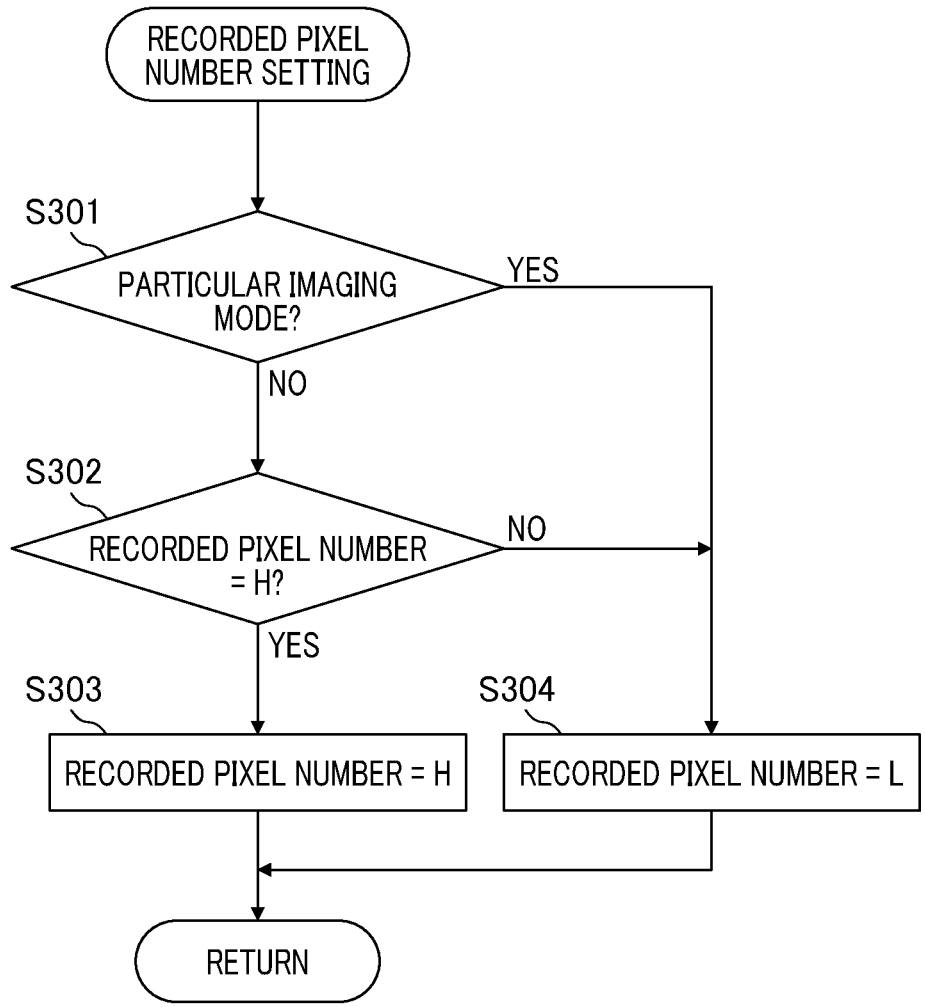
FIG. 3 is a flowchart that exemplifies the setting process for the recorded pixel number in FIG. 2.

FIG. 3 is a flowchart for explaining the recorded pixel number setting that is shown in S203 in FIG. 2.

First, in S301, the CPU 111 detects the state of the imaging mode selection switch 118. If the imaging mode is set to a particular mode, the processing proceeds to S304, and otherwise, the processing proceeds to S302. The term "particular mode" denotes, for example, a mode applied to a low recorded pixel number, such as when an image is appended to an electronic mail and the like. In S302, the CPU 111 identifies whether the recorded pixel number has been set to high "H" by the recorded pixel number setting unit 117. If the setting information is "H", the processing proceeds to step S303, and otherwise, the processing proceeds to S304. The setting of the recorded pixel number by the recorded pixel number setting unit 117 is carried out by user input using, for example, an operation device (not illustrated). In S303, processing in which the setting information for the recorded pixel number is stored in memory as "H" is executed. In S304, processing in which the setting information for the recorded pixel number is stored in memory as "L" is executed.

Figure 4:
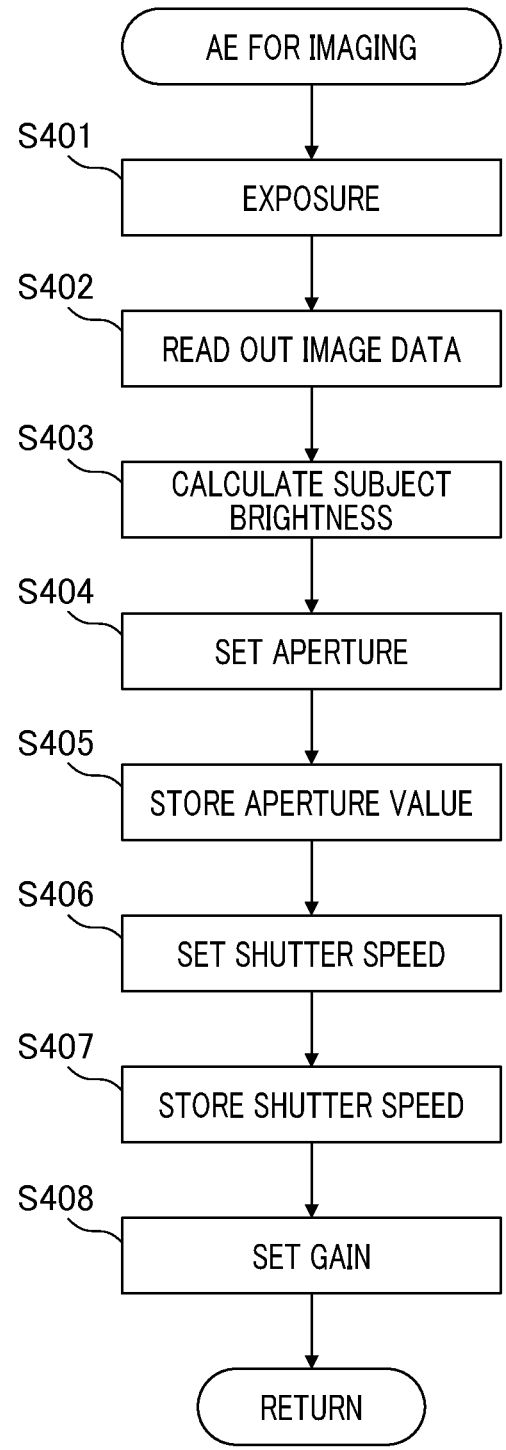
FIG. 4 is a flowchart that exemplifies AE process for the imaging in FIG. 2.

FIG. 4 is a flowchart for explaining the AE for the imaging that is shown in S204 of FIG. 2.

First, in S401, exposure of the imaging element 107 is carried out, and in S402, the CPU 111 executes processing in which image data from the imaging element 107 is read out. In S403, the CPU 111 calculates the subject brightness based on the image data that has been read out in S402. In S404, the CPU 111 determines the aperture value of the diaphragm 103 depending on the subject brightness that has been calculated in S403, and controls the diaphragm 103 by using the diaphragm drive motor 104 so as to attain this aperture value. In S405, the data for the aperture value that has been determined in S404 is stored in the memory. In S406, the CPU 111 sets the shutter speed corresponding to the exposure time depending on the subject brightness that was calculated in S403. In S407, the data for the shutter speed that has been set in S406 is stored in memory. In S408, the CPU 111 carries out the gain setting depending on the subject brightness that has been calculated in S403. Specifically, the gain for making the brightness level of the image data a predetermined multiple is set. Then, return processing is carried out.

Figure 5:
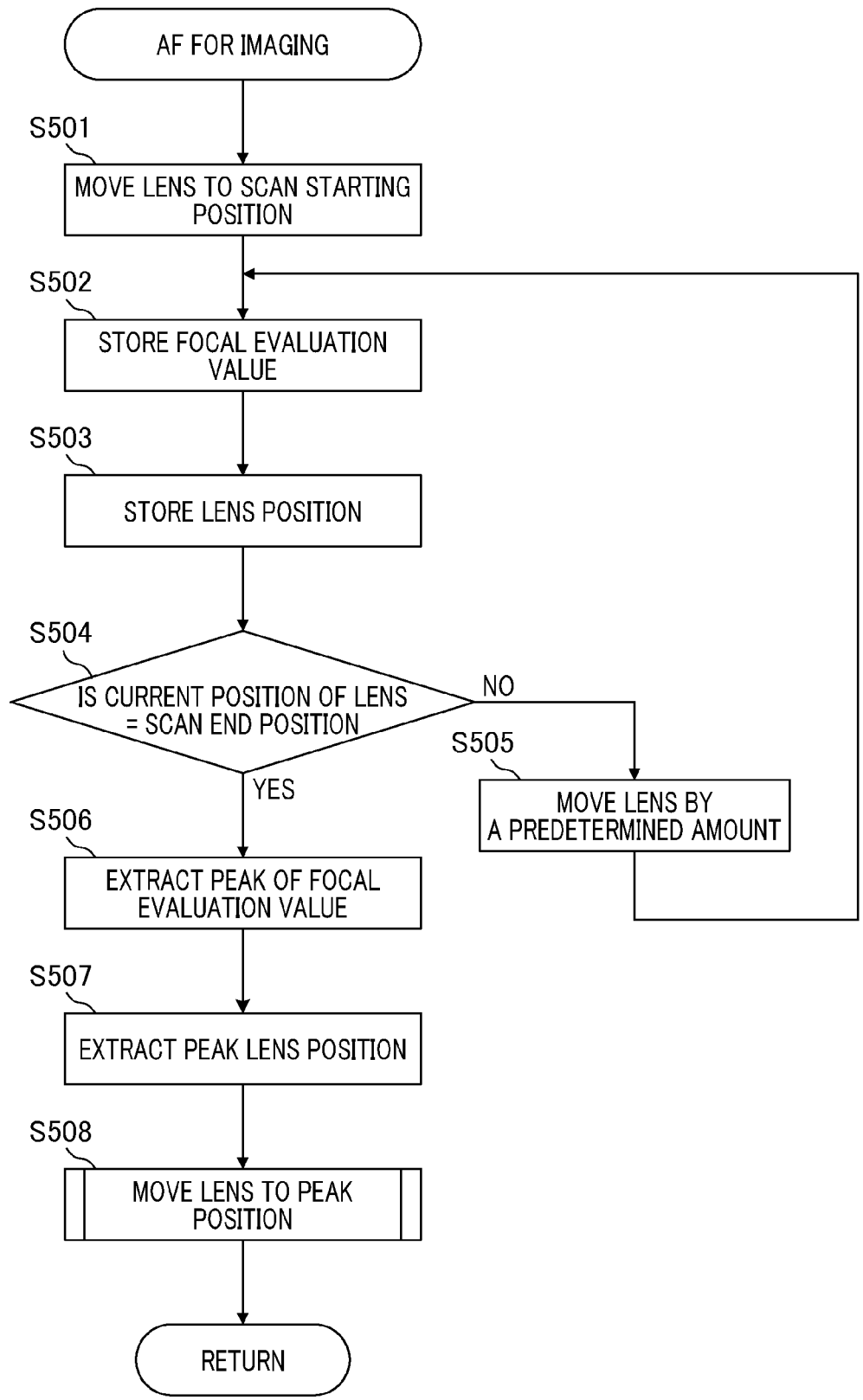
FIG. 5 is a flowchart that exemplifies AF process for the imaging in FIG. 2.

FIG. 5 is a flowchart for explaining the AF for the imaging that is shown in S205 of FIG. 2. In the following explanation, the term "scan" denotes the processing from S501 to S505.

First, in S501, the focus lens drive motor 102 moves the focus lens 101 toward the scan start position depending on the drive signal from the CPU 111. Here, the scan start position is the end position of the focusable range on the infinity side. In S502, the analogue image signal that is read out after exposure of the imaging element 107 is converted to a digital signal by the A/D converter 108, and the image process processor 109 extracts the high frequency component of the brightness signal from this output and stores the data in memory. This is used as an evaluation value (below, referred to as the "focus evaluation value") for focus adjustment. In S503, data that shows the current position of the focus lens 101 is stored in memory. When a stepping motor is used for the focus lens drive motor 102, the position of the focus lens 101 is set by using the pulse drive number from an initial position (not illustrated). S504 is a process for determining whether or not the current position of the focus lens 101 that has been stored in S503 is the same as the scan end position.

Here, the term "scan end position" denotes an end position of the focusable range at the proximal end side. In the case in which both positions are the same, the processing proceeds to S506, and otherwise, the processing proceeds to S505. In S505, the CPU 111 controls the focus lens drive motor 102 such that the focus lens 101 moves by a predetermined amount toward the scan end position, and then returns to the processing of S502.

In S506, the CPU 111 carries out processing that searches for the largest value among the focus evaluation values that were stored in S502, that is, the peak of the focus evaluation values. In S507, from among the positions of the focus lens 101 that have been stored in S503, the CPU 111 searches for the position of the focus lens 101 corresponding to the peak of the focus evaluation value that was extracted in S506, that is, the lens position at the peak value (below, referred to as the "peak position"). In S508, the CPU 111 controls the focus lens drive motor 102 such that the focus lens 101 moves to the peak position obtained in S507 according to the procedure described below.

Figure 6:
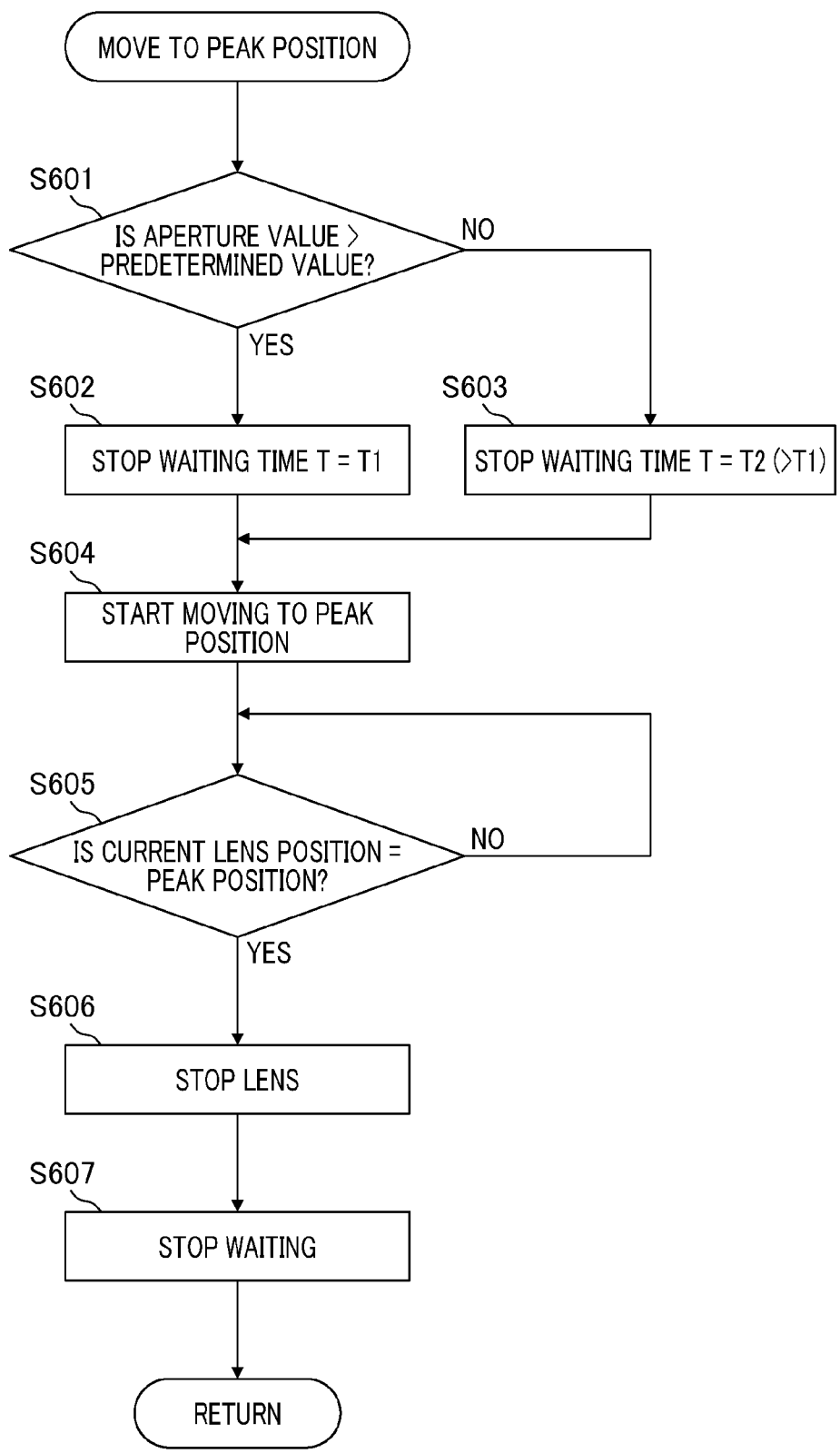
FIG. 6 is a flowchart that exemplifies the movement process in FIG. 5 of the focus lens to the peak position.

FIG. 6 is a flowchart for explaining the movement control of the focus lens 101 to the peak position, which is shown in S508 in FIG. 5.

First, in S601, the CPU 111 determines whether or not the aperture value of the diaphragm 103, which is shown by data that has been stored in S405 in FIG. 4, is larger than a predetermined value. The "predetermined value" denotes a threshold value for a determination that is set in advance. The CPU 111 determines whether or not the diaphragm 103 is more closed than a predetermined value. In the case in which the aperture value is larger than the predetermined value, the processing proceeds to S602, and otherwise, the processing proceeds to S603. In S602, the CPU 111 carries out the time setting for the timer 116. In the case in which a control command that stops the focus lens 101 has been output, the setting time in this case is the stop waiting time (abbreviated "T") until the movement control of the lens has completed, and here, the CPU 111 sets the setting time to T1. In contrast, in S603, the CPU 111 sets the stop waiting time T of the focus lens 101 to T2. Herein, the relationship T1<T2 holds.

After S602 and S603, in S604, the CPU 111 controls the focus lens drive motor 102 such that the movement of the focus lens 101 to the peak position that has been retrieved in S507 in FIG. 5 begins. In S605, the CPU 111 detects the current position of the focus lens 101, and compares this position to the peak position. In the case in which the current position is equal to the peak position, the processing proceeds to S606, and if this is not the case, the determination of S605 is repeated. In S606, the CPU 111 directs the focus lens drive motor 102 to stop the movement of the focus lens 101. In S607, after directing the focus lens 101 to stop, the CPU 111 executes waiting processing on the time that has been set in the timer 116 in S602 or S603. This "time waiting after the stop command" denotes the timing operation that waits for the convergence of the oscillation of the focus lens 101 in the optical axis direction during which the stop waiting time T has elapsed while stopping.

According the process explained using FIG. 6, when the aperture value of the diaphragm 103 is larger than a threshold value, that is, when the diaphragm 103 is more closed, the stop waiting time T1 is shorter than the stop waiting time T2 while the diaphragm 103 is more open. The reason is that the depth of focus becomes deep due to closing the diaphragm 103, that is, the tolerated amount of the focus deviation at the focal plane has become large.

Figure 7A:
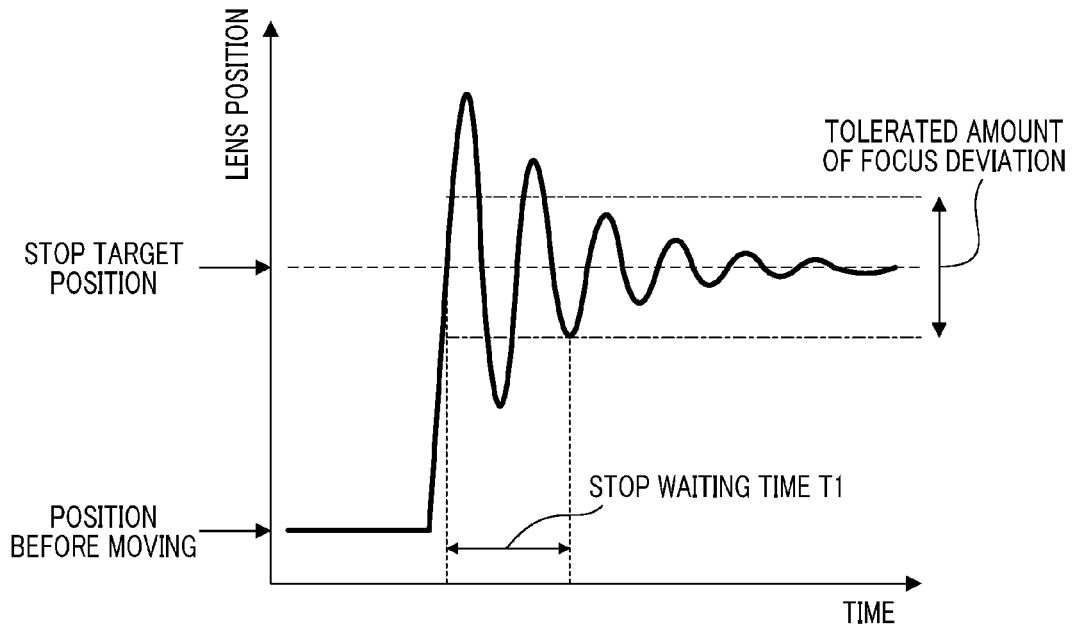
FIG. 7A is a drawing for explaining the relationship between the oscillation convergence time, the stop waiting time, and the tolerated amount of the focus deviation of the focus lens.
Figure 7B:
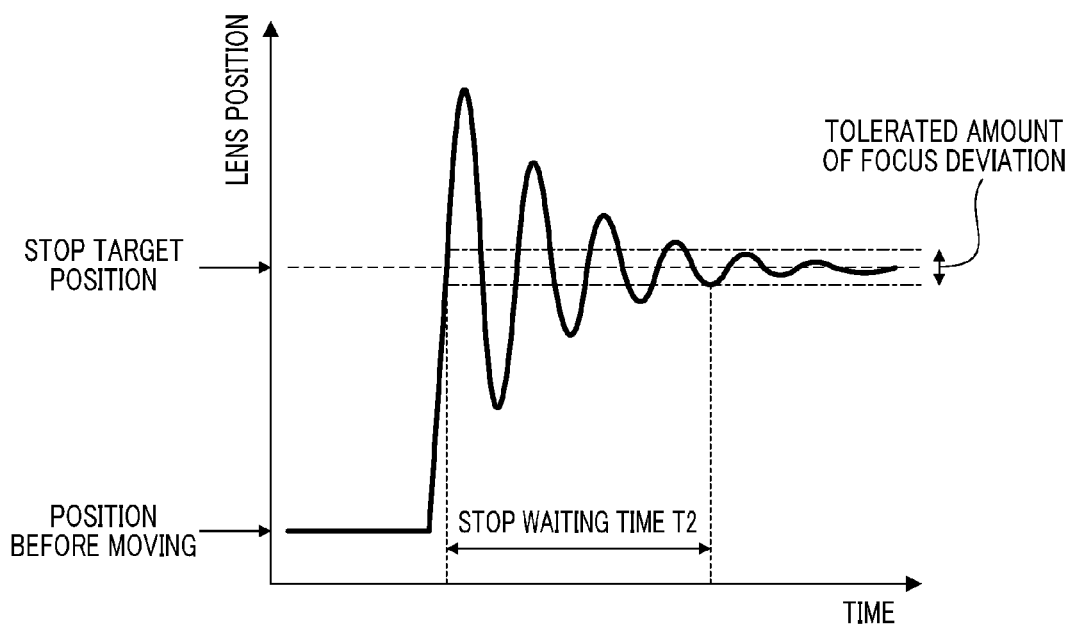
FIG. 7B is a drawing for explaining the relationship between the oscillation convergence time, the stop waiting time, and the tolerated amount of the focus deviation of the focus lens when the diaphragm is closed.

In FIGS. 7A and 7B are graphs in which the horizontal axis is time and the vertical axis exemplifies the time change of the position of the focus lens 101. The focus lens 101 reaches the stop target position from the position before movement, and after overshooting, the lens position converges due to attenuating oscillation.

FIG. 7A represents the relationship between the oscillation of the focus lens 101 and the tolerated amount of focus deviation, and is the case in which the tolerated amount of focus deviation is comparatively large and the stop waiting time has been set to T1. Immediately after the focus lens 101 stops, the amplitude of the oscillation is large, but it converges with the passage of time. However, even in the state in which the oscillation is large, in the case in which the amount of focus deviation due to this oscillation is within a tolerated range, in other words, in the case of the imaging conditions are within the depth of focus, there is little influence on the captured image. Therefore, stop waiting time T1 can be set to a short time.

In contrast, because the depth of focus is shallow when the diaphragm 103 is open, it is necessary to wait until the amplitude of the oscillation of the focus lens 101 becomes sufficiently small so that the amount of focus deviation stays within a tolerated range. FIG. 7B represents the relationship between the oscillation of the focus lens 101 and the tolerated amount of focus deviation in such a case, and the stop waiting time T2 must be set so as to be long in comparison to T1.

As explained above, in the first embodiment, the stop waiting time T of the focus lens 101 is set to a suitable value depending on the setting value of the diaphragm 103 during imaging. Specifically, because the oscillation convergence time of the focus lens can be suitably set depending on the imaging conditions, needless waiting time can be reduced. Thus, the photographer can carry out satisfying photography because the time lag before imaging is shortened.

Second Embodiment

Next, a second embodiment of the present invention will be explained. In the second embodiment, the stop waiting time T of the focus lens 101 is changed depending on the recorded pixel number. Below, the points of difference between the second embodiment and the first embodiment will be explained, and by using the reference numerals that have already been used for structural elements that are the same as those in the case of the first embodiment, the detailed explanation thereof is omitted. Note that the manner in which such explanations are omitted is identical to the other embodiments described below.

Figure 8:
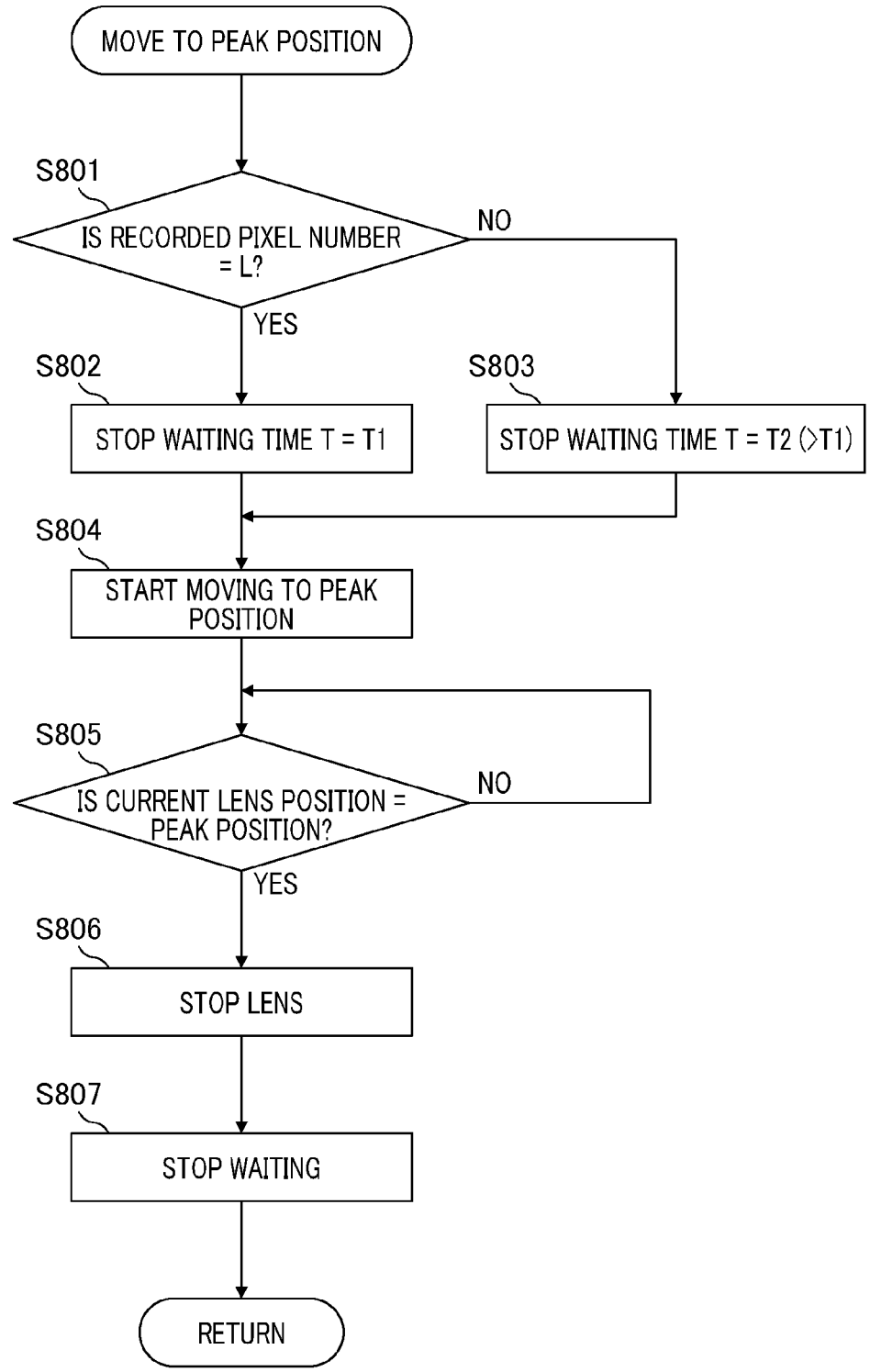
FIG. 8 is a flowchart that exemplifies, in a second embodiment of the present invention, the movement process of the focus lens to the peak position.

FIG. 8 is a flowchart that is to be used instead of FIG. 6, which was explained in the first embodiment. The processing in S804 to S807 is identical to the processing in S604 to 607 in FIG. 6, and thus, the explanation thereof is omitted, and below, the processing in S801 to 803 will be explained.

In S801, the CPU 111 compares the recorded pixel number that has been stored in S303 and 304 in FIG. 3 to a threshold value. In the case in which the recorded pixel number is equal to or less than the threshold value and has been determined to be "L", the processing proceeds to S802, and in the case in which the recorded pixel number exceeds the threshold value and has been determined to be "H", the processing proceeds to S803. In S802, the CPU 111 sets the stop waiting time T of the focus lens 101 to T1. In addition, in S803, the CPU 111 sets the stop wait time T of the focus lens 101 to T2. Here, T1<T2. Note that the stop waiting time of the focus lens 101 in S807 is either T1, which has been set in S802, or T2, which has been set in S803.

In the process that has been explained in FIG. 8, the stop waiting time T1 for the case in which the setting information of the recorded pixel number is "L" is shorter than the stop waiting time T2 for the case in which the setting information of the recorded pixel number is "H". The reason is that the permissible blur circle diameter becomes large due to the recorded pixel number becoming small, and the depth of focus becomes deep.

For example, in the case in which the setting information of the recorded pixel number is "H", there are 4000 horizontal pixels and 3000 vertical pixels, and in the case in which the setting information of the recorded pixel number is "L", there are 2000 horizontal pixels and 1500 vertical pixels. The setting information "L" of the recorded pixel number referred to here does not mean that the pixel number is reduced by trimming the image data that has been read out from the imaging element 107. While maintaining the angle of view so as to be identical to the case in which the setting information of the recorded pixel number is "H", only the recorded pixel number made small. In this context, one pixel in the case in which the setting information of the recorded pixel number is "L" is enlarged to a total of four pixels, two pixels each, i.e., two horizontal and two vertical, in the case in which the setting information of the recorded pixel number is "H". Therefore, in terms of the imaging element 107, the area of one pixel in the case in which the setting information of the recorded pixel number is "L" can be understood to have increased to four times the area of one pixel in the case in which the setting information of the recorded pixel number is "H". The larger the area one pixel becomes, the larger the permissible blur circle diameter becomes. Thus, the depth of focus in the case in which the setting information of the recorded pixel number is "L" becomes deeper than the case in which it is "H". Thus, when the depth of focus is deep, that is, in the case in which the setting information of the recorded pixel number is "L", the stop waiting time T1 may be a short time. In contrast, when the depth of focus is shallow, that is, in the case in which the setting information of the recorded pixel number is "H", the stop waiting time T2 must be set to a long time.

According to the second embodiment, the needless stop waiting time can be reduced by setting the stop waiting time of the focus lens 101 to a suitable value depending on the setting information of the recorded pixel number. Thus, the photographer can carry out satisfying photography because the time lag before imaging is shortened.

Third Embodiment

Next, a third embodiment of the present invention will be explained. In the third embodiment, the stop waiting time T of the focus lens 101 is changed depending on the shutter speed.

Figure 9:
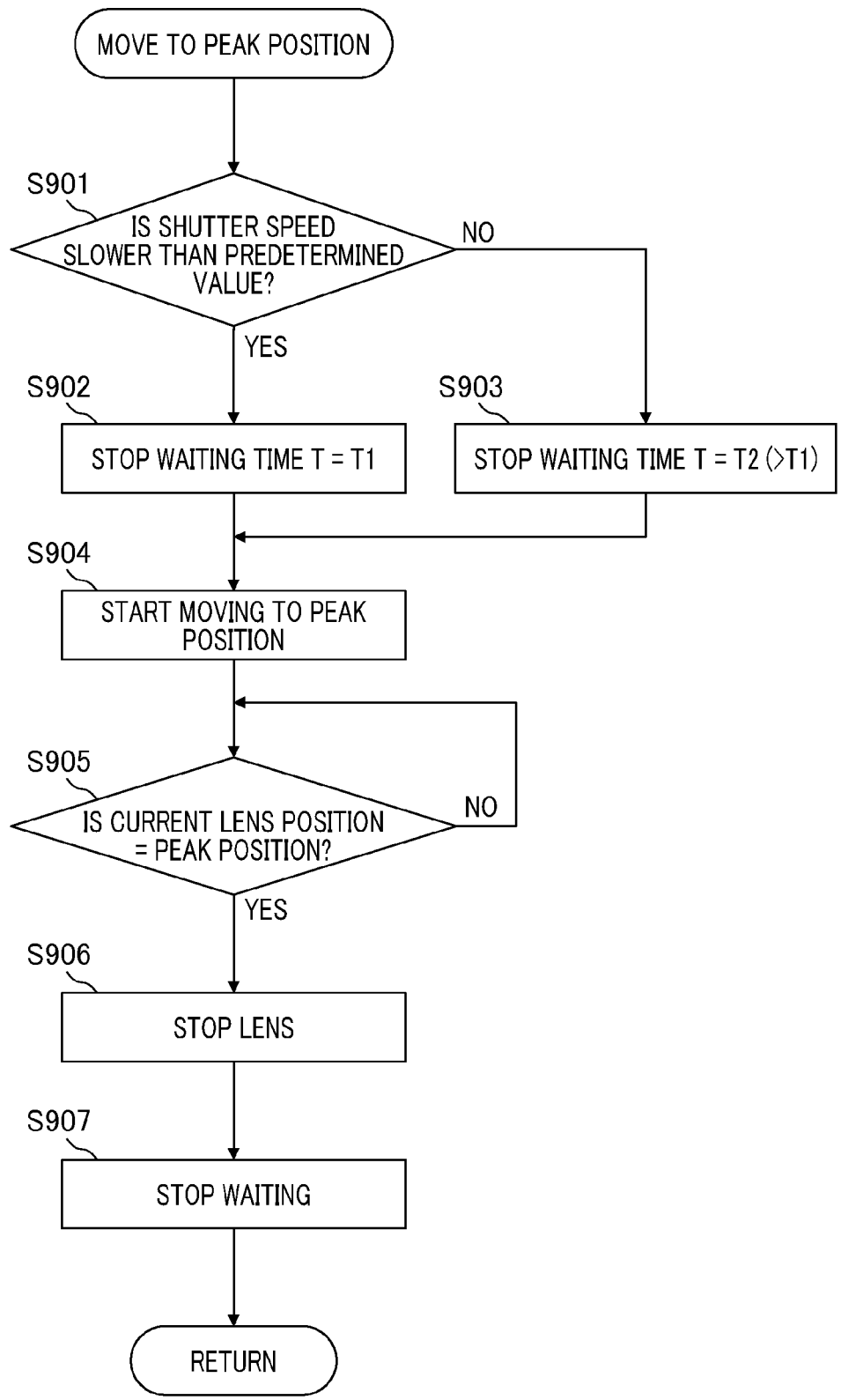
FIG. 9 is a flowchart that exemplifies, in a third embodiment of the present invention, the movement process of the focus lens to the peak position.

FIG. 9 is a flowchart that is to be used instead of FIG. 6 in the first embodiment. The processing in S904 to 907 is identical to that in S604 to 607 in FIG. 6, and thus, the explanation thereof has been omitted.

First, in S901, the CPU 111 compares the value of the shutter speed that has been stored in the memory in S407 in FIG. 4 to a predetermined value (threshold value). In the case in which the CPU 111 has determined that the value of the shutter speed is slower than the threshold value, the processing proceeds to S902, and otherwise, proceeds to S903. In S902, the CPU 111 sets the stop waiting time T of the focus lens 101 to T1. In addition, in S903, the CPU 111 sets the stop waiting time T of the focus lens 101 to T2. Here T1<T2. The stop waiting time of the focus lens 101 in S907 is either T1, which has been set in S902, or T2, which has been set in S903.

In the processing that has been explained in FIG. 9, the stop waiting time T1, which has been set in the case in which the shutter speed is slower than a predetermined value, that is, which has set in the case in which the exposure time is long, is shorter than the stop waiting time T2, which is set in the case in which the shutter speed is faster than a predetermined value. This is due to reasons explained below.

Even if the focus deviation due to the oscillation of the focus lens 101 exceeds the depth of focus (the tolerated amount of the focus deviation at the focal plane) immediately after stopping, the oscillation will finally converge so as to fall within the tolerated amount of focus deviation. Thus, in the case in which the time during which the focus deviation exceeds the tolerated amount of focus deviation is sufficiently short with respect to the exposure time overall, the influence of this deviation on the captured image is small. That is, if the exposure time is long, the proportion of the oscillation convergence time of the focus lens 101 that takes up the exposure time becomes relatively short. Thus, the longer the exposure time, or in other words, the slower the shutter speed, even if the stop waiting time T is short, the real loss to the captured image is small.

Figure 10A:
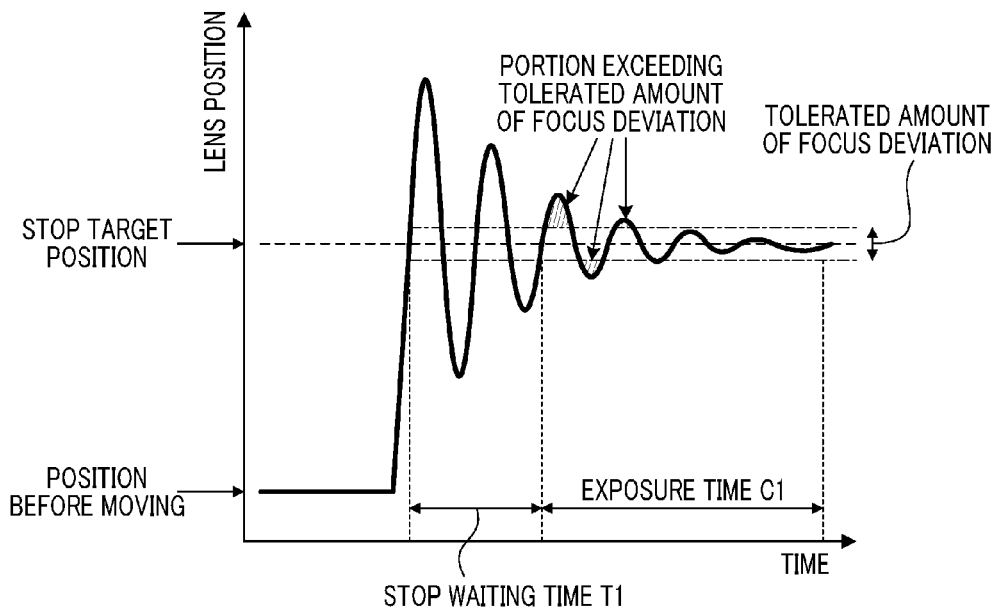
FIG. 10A is a drawing for explaining, in a third embodiment of the present invention, the relationship between the oscillation convergence time, the stop waiting time, the exposure time, and the tolerated amount of focus deviation of the focus lens in the case in which the exposure time C2 is longer than a predetermined value.
Figure 10B:
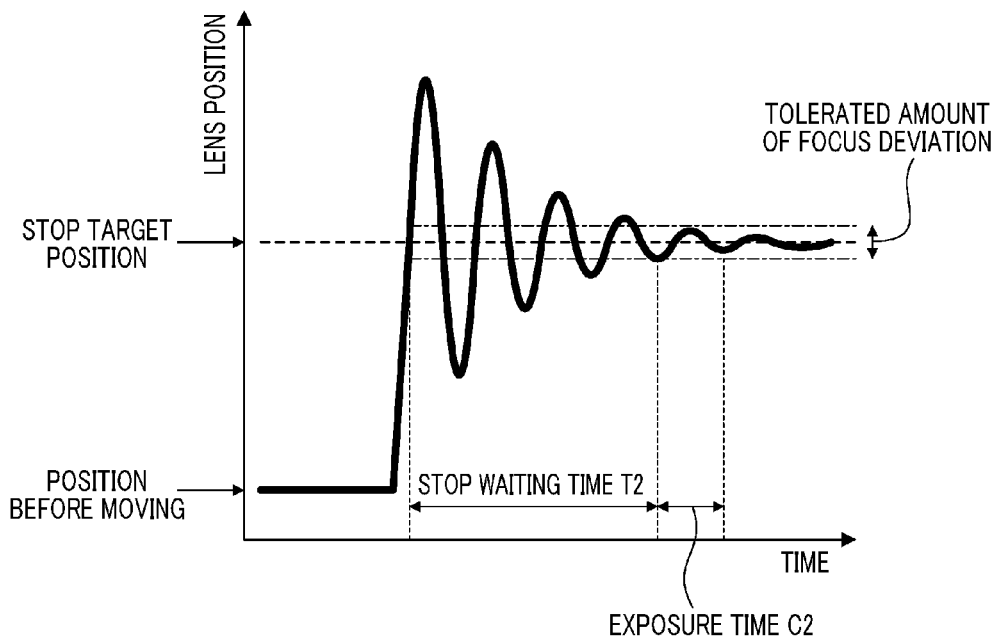
FIG. 10B is a drawing for explaining, in the third embodiment of the present invention, the relationship between the oscillation convergence time, the stop waiting time, the exposure time, and the tolerated amount of focus deviation of the focus lens in the case in which the exposure time C2 is shorter than a prescribed value.

FIG. 10A and FIG. 10B are graphs that illustrate the time change, where the horizontal axis is the time and the vertical axis is the position of the focus lens 101. FIG. 10A represents the relationship between convergence of the oscillation of the focus lens 101, the stop waiting time, and the exposure time, and is the case in which the exposure time C1 is longer than a predetermined value. This corresponds to the case in which the stop waiting time in S902 in FIG. 9 is set to the short waiting time T1. The stop waiting time T1 is set to a time that is shorter than the time during which the oscillation of the focus lens 101 falls sufficiently within the tolerated amount of focus deviation. Therefore, even during the exposure time, there is the case in which the tolerated amount of focus deviation is exceeded, and the hatched line portion in FIG. 10A corresponds to this case. However, because the exposure time after the oscillation falls within the tolerated amount of focus deviation is sufficiently long, the influence on the captured image due to this hatched line portion is not a practical problem.

In contrast, in the case in which the exposure time is short, the influence on the captured image becomes large due to the focus deviation caused by the oscillation of the focus lens 101. FIG. 10B shows the case in which the exposure time C2 is shorter than a predetermined value. This corresponds to the case in which the stop waiting time in S903 in FIG. 9 has been set to the long waiting time T2. In this case, because the exposure time C2 is short, the influence on the captured image is large due to oscillation that exceeds the tolerated amount of focus deviation. Therefore, by setting the stop waiting time to a long waiting time T2, the CPU 111 starts the exposure after waiting until the oscillation of the focus lens 101 falls within the tolerated amount of focus deviation.

According to the third embodiment, needless waiting time can be reduced by setting the stop waiting time T of the focus lens 101 to a suitable value depending on the set value of the shutter speed. Thus, the photographer can carry out satisfying photography because the time lag before imaging is shortened.

Fourth Embodiment

Next, a fourth embodiment of the present invention will be explained. In the fourth embodiment, the stop waiting time of the focus lens 101 is changed depending on the attitude of the imaging apparatus.

Figure 11:
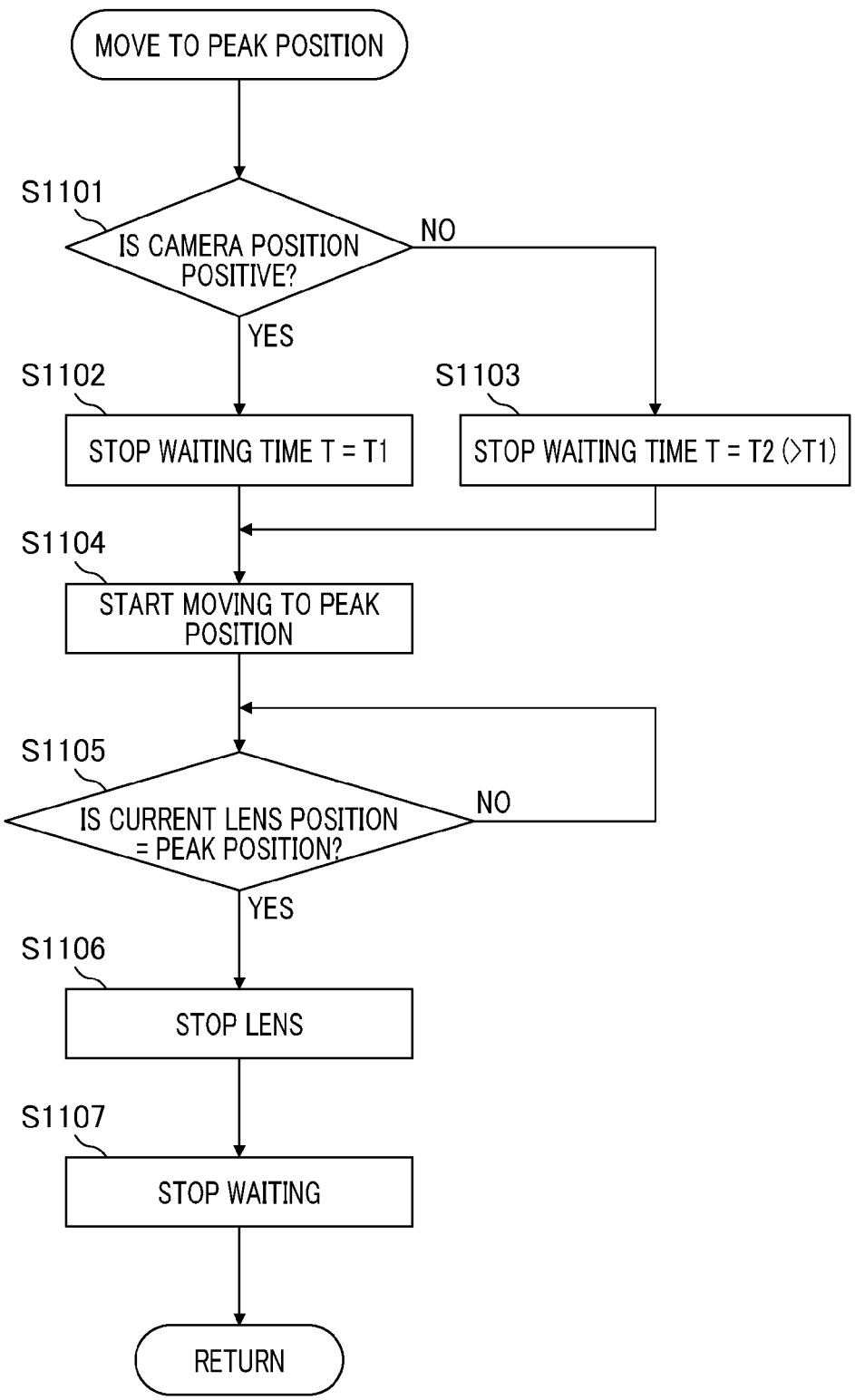
FIG. 11 is a flowchart that exemplifies, in a fourth embodiment of the present invention, the movement process of the focus lens to the peak position.

FIG. 11 is a flowchart that is to be used instead of FIG. 6 in the first embodiment. The processing in S1104 to S1107 is identical to that in S604 to S607 in FIG. 6, and thus, the processing of S1101 to S1103 will be explained.

In S1101, the CPU 111 determines the state of the imaging apparatus based on the detection signal of the attitude detection sensor 119. In the case in which the CPU 111 has determined that the attitude of the apparatus is a positive position, that is, the optical axis of the focus lens 101 is substantially horizontal to the ground plane, or in other words, the attitude is one in which the optical axis of the focus lens 101 is substantially perpendicular to the direction of gravity, the processing proceeds to S1102. In addition, in the case in which the CPU has determined that the attitude of the position is not a positive position, that is, the optical axis of the focus lens 101 is substantially perpendicular to the ground plane, or in other words, the attitude is one in which the optical axis of the focus lens 101 is substantially parallel to the direction of gravity, the processing proceeds to S1103. In S1102, the CPU 111 sets the stop waiting time T of the focus lens 101 to T1. In S1103, the CPU 111 sets the stop waiting time T of the focus lens 101 to T2. Here T1<T2. The stop waiting time of the focus lens 101 in S1107 is either T1, which has been set in S1102, or T2, which has been set in S1103.

In the case in which the attitude is one in which the optical axis of the focus lens 101 is oriented in a perpendicular direction, the movement direction of the focus lens 101 is aligned with the direction of gravity. Therefore, due to the influence of gravity, the convergence time for the oscillation of the focus lens 101 after stopping becomes long. Thus, in S1103, the CPU 111 sets the stop waiting time T2 of the focus lens 101 to a long time. In contrast, in the case in which the attitude is one in which the optical axis of the focus lens 101 is horizontal, the movement direction of the focus lens 101 is not aligned with the direction of gravity. Thus, the convergence time of the oscillation of the focus lens 101 after stopping is short in comparison to the case of an attitude in which the optical axis is in a perpendicular direction. Thus, in S1102, the stop waiting time T1 of the focus lens 101 that is set by the CPU 111 may be a short time.

According to the fourth embodiment, by setting the stop waiting time T of the focus lens 101 to a suitable value depending on the attitude of the imaging apparatus, needless waiting time can be reduced. Thus, the photographer can carry out satisfying photography because the time lag before imaging is shortened.

Other Embodiments

In the above embodiments, an example of control has been shown in which two stop waiting times T1 and T2 are changed depending on the imaging conditions. However, the invention is not limited thereby, and the length of the stop waiting time T may be changed as continuous values depending on the aperture value, the recorded pixel number, the shutter speed, and the apparatus attitude. For example, in the case in which an attitude has been detected in which the optical axis of the focus lens is in a tilted state with respect to the direction of gravity, the apparatus attitude with respect to the perpendicular direction is detected as the tilt angle of the optical axis, and control in which the stop waiting time T is shortened depending on the detected angle is possible.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via al network or from a recording medium of various types serving as the memory device (e.g., computer-readable medium).

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-132562 filed Jun. 14, 2011 which is hereby incorporated by reference herein in its entirety.

What is claimed is:

1. An optical apparatus provided with a drive unit that moves a focus lens, comprising a control unit configured to carry out focus adjustment by controlling the drive unit,
wherein the control unit sets a waiting time between outputting a control command to stop the focus lens to the drive unit and moving to the next process, and
wherein the control unit changes the waiting time on the basis of an aperture value of a diaphragm.

2. The optical apparatus according to claim 1, wherein the control unit sets the waiting time for a case in which the aperture value is a first value, so as to be shorter than the waiting time for a case in which the aperture value is a second value that is smaller than the first value.

3. The optical apparatus according to claim 2, wherein a depth of focus at the case in which the aperture value is the first value is deeper than a depth of focus at the case in which the aperture value is the second value.

4. The optical apparatus according to claim 2, wherein the first value is larger than a predetermined diaphragm value, and the second value is smaller than the predetermined diaphragm value.

5. The optical apparatus according to claim 1, wherein the next process that is moved to after the waiting time has elapsed is an imaging process.

6. The optical apparatus according to claim 1, further comprising a setting unit configured to set a pixel number for recording a captured image,
wherein the control unit sets the waiting time for a case in which the pixel number set by the setting unit is a first pixel number, so as to be shorter than the waiting time for a case in which the pixel number is a second pixel number that is larger than the first pixel number.

7. The optical apparatus according to claim 1, wherein the control unit sets the waiting time for a case in which the exposure time of an imaging element that images a subject is a first time, so as to be shorter than the waiting time for a case in which the exposure time is a second time that is shorter than the first time.

8. The optical apparatus according to claim 7, wherein the first time is longer than a predetermined time, and the second time is shorter than the predetermined time.

9. A control method that is executed by an optical apparatus that is provided with a drive unit that moves a focus lens, comprising:
carrying out focus adjustment by controlling the drive unit; and
setting a waiting time between outputting a control command to stop the focus lens to the drive unit and moving to the next process,
wherein the waiting time is changed on the basis of an aperture value of a diaphragm.

10. An optical apparatus provided with a drive unit that moves a focus lens, comprising a control unit configured to carry out focus adjustment by controlling the drive unit,
   wherein the control unit sets a waiting time between outputting a control command to stop the focus lens to the drive unit and moving to the next process, and
   wherein the control unit changes the waiting time on the basis of a focal depth.

11. The optical apparatus according to claim 10, wherein the control unit sets the waiting time for a case in which an aperture value of a diaphragm is a first value, so as to be shorter than the waiting time for a case in which the aperture value is a second value that is smaller than the first value.

12. The optical apparatus according to claim 11, wherein the first value is larger than a predetermined diaphragm value, and the second value is smaller than the predetermined diaphragm value.

13. The optical apparatus according to claim 10, wherein the next process that is moved to after the waiting time has elapsed is an imaging process.

14. The optical apparatus according to claim 10, further comprising a setting unit configured to set a pixel number for recording a captured image, wherein the control unit sets the waiting time for a case in which the pixel number set by the setting unit is a first pixel number, so as to be shorter than the waiting time for a case in which the pixel number is a second pixel number that is larger than the first pixel number.

15. The optical apparatus according to claim 10, wherein the control unit sets the waiting time for a case in which the exposure time of an imaging element that images a subject is a first time, so as to be shorter than the waiting time for a case in which the exposure time is a second time that is shorter than the first time.

16. The optical apparatus according to claim 15, wherein the first time is longer than a predetermined time, and the second time is shorter than the predetermined time.

17. The optical apparatus according to claim 10, wherein the control unit sets the waiting time for a first focal depth so as to be shorter than the waiting time for a second focal depth that is shallower than the first focal depth.

18. An optical apparatus provided with a drive unit that moves a focus lens, comprising:
   a control unit configured to carry out focus adjustment by controlling the drive unit; and
   a setting unit configured to set a pixel number for recording a captured image,
   wherein the control unit sets a waiting time between outputting a control command to stop the focus lens to the drive unit and moving to the next process, and
   wherein the control unit changes the waiting time on the basis of the pixel number set by the setting unit.

19. The optical apparatus according to claim 18, wherein the control unit sets the waiting time for a case in which the pixel number set by the setting unit is a first pixel number, so as to be shorter than the waiting time for a case in which the pixel number is a second pixel number that is larger than the first pixel number.

* * * * *